United States Patent [19]

Mogi et al.

[11] 4,280,139
[45] Jul. 21, 1981

[54] MUTING CIRCUIT FOR A TELEVISION RECEIVER

[75] Inventors: Takao Mogi; Yoshio Ishigaki, both of Tokyo; Hisao Okada, Yokohama, all of Japan

[73] Assignee: Sony Corporation, Tokyo, Japan

[21] Appl. No.: 83,415

[22] Filed: Oct. 10, 1979

[30] Foreign Application Priority Data

Oct. 12, 1978 [JP] Japan .................. 53-140166

[51] Int. Cl.³ .............................................. H04N 5/60
[52] U.S. Cl. .................................... 358/165; 455/174; 455/194
[58] Field of Search ................. 358/165; 455/174, 194

[56] References Cited

U.S. PATENT DOCUMENTS

| | | | |
|---|---|---|---|
| 3,619,492 | 11/1971 | Evans | 358/165 |
| 3,707,597 | 12/1972 | Lunn | 455/174 |
| 3,825,838 | 7/1974 | Mayle | 358/165 |
| 4,047,226 | 9/1977 | Hedges | 358/165 |
| 4,121,254 | 10/1978 | Morita | 455/194 |

*Primary Examiner*—Robert L. Griffin
*Assistant Examiner*—Michael A. Masinick
*Attorney, Agent, or Firm*—Lewis H. Eslinger; Alvin Sinderbrand

[57] ABSTRACT

A muting circuit for a television receiver of the type having a tuner which is operative to select a desired channel in accordance with a channel selection operation to produce a channel select signal representing the selected channel, a detector circuit for detecting whether a video signal is present or not, a muting signal generator circuit supplied with an output from the detector circuit and the channel select signal representing the selection of a predetermined channel to produce a muting signal when the predetermined channel is selected but no output is produced by the detector circuit, and a muting circuit coupled to a low frequency signal transmission path in response to the muting signal from the muting signal generator circuit to cut off or attenuate the transmission of a low frequency signal.

4 Claims, 1 Drawing Figure

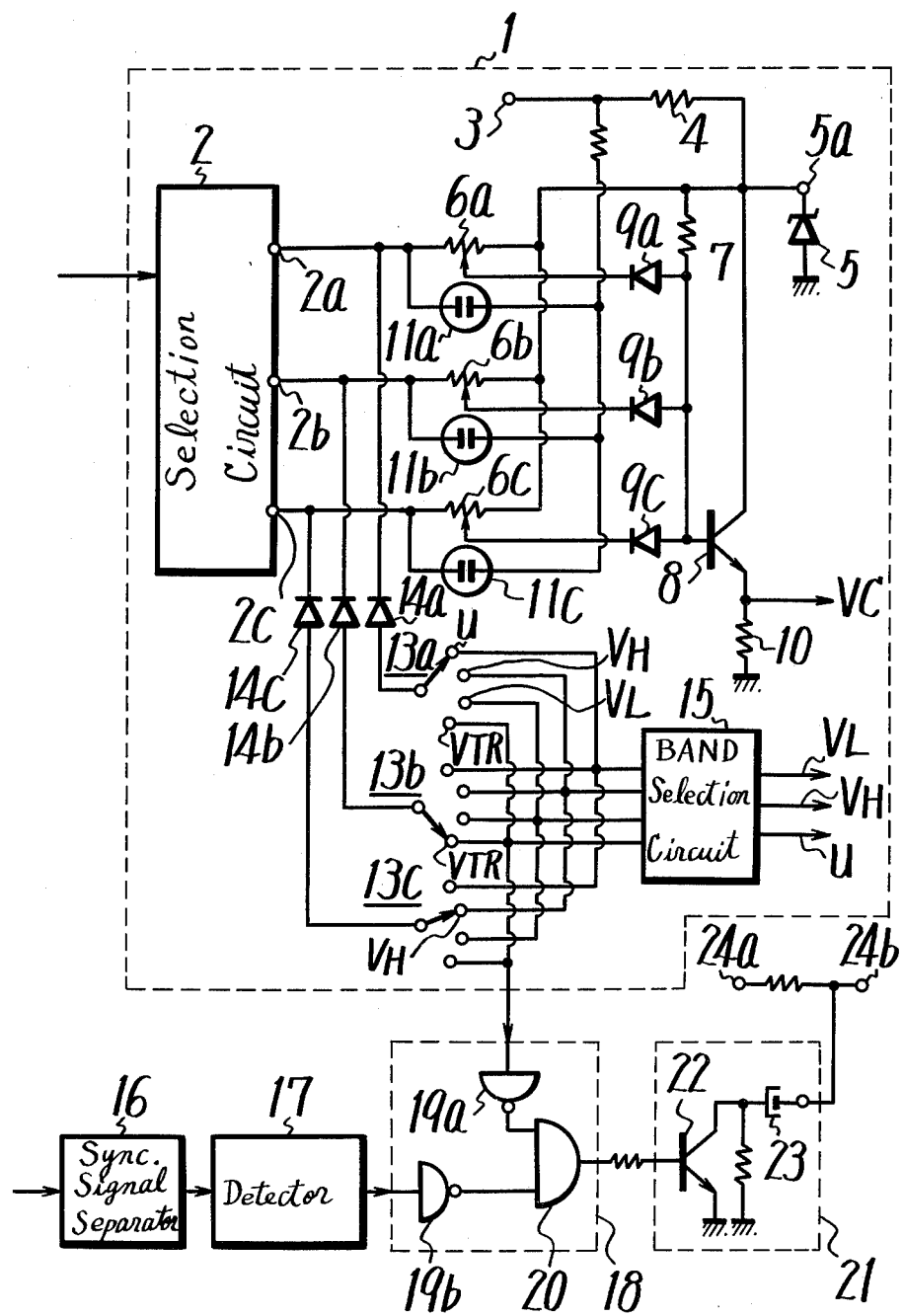

MUTING CIRCUIT FOR A TELEVISION RECEIVER

BACKGROUND OF THE INVENTION

1. Field of the Invention

The present invention relates to a muting circuit for a television receiver.

2. Description of the Prior Art

In general, when video signal reproduced by a VTR (video tape recorder) is displayed as an image on an ordinary home television receiver serving as a monitor the RF (radio frequency) converter of the VTR supplies an output signal to the antenna terminal of the television receiver. To receive and display this reproduced video signal, the television receiver is set to a predetermined unused channel whereby the reproduced video signal then is reproduced as an image as if it had been broadcasted on that predetermined unused channel. In this case, if the television receiver is set to the predetermined channel and thereafter power is applied to the VTR, there is the disadvantage that, during the interval from the time that the VTR starts its operation to the time that the RF converter in the VTR reaches its operating condition to supply a carrier having the frequency corresponding to the predetermined channel, a noise is generated in the sound circuit of the television receiver and hence the sound reproduced from the sound circuit is very unpleasant.

OBJECTS AND SUMMARY OF THE INVENTION

Accordingly, an object of the present invention is to provide a muting circuit for a television receiver which will overcome the aforenoted disadvantage.

Another object of the invention is to provide a muting circuit for a television receiver wherein even if the television receiver is set to its predetermined channel to display the VTR-produced signal and thereafter the VTR is turned ON, there is generated no noise which will cause unpleasant sounds to a listener or viewer.

According to one embodiment of the present invention, a muting circuit is provided for a television receiver of the type having a tuner which is operative to select a desired channel in accordance with a channel selection operation to produce a channel select signal representing the selected channel; the muting circuit comprising a detector circuit for detecting whether a video signal is present or not; a muting signal generator circuit supplied with an output from said detector circuit and the channel select signal representing the selection of a predetermined channel to produce a muting signal when the predetermined channel is selected but no output is produced by said detector circuit; and a muting circuit coupled to a low frequency signal transmission path, said muting circuit being operated by the muting signal from said muting signal generator circuit to cut off or attenuate the transmission of a low frequency signal.

Various other objects, features and advantages of the present invention will become apparent from the following description taken in conjunction with the accompanying drawing.

BRIEF DESCRIPTION OF THE DRAWING

The FIGURE is a partial schematic, partial block diagram showing an example of the muting circuit for a television receiver according to the present invention.

DESCRIPTION OF THE PREFERRED EMBODIMENT

The present invention will be hereinbelow described with reference to the accompanying drawing.

The FIGURE is a connection diagram, partially in block, showing an embodiment of the muting circuit for a television receiver according to the present invention. In the FIGURE, 1 designates a tuner which includes a selection circuit 2. In this case, selection circuit 2 is provided with a plurality of selection output terminals, for example, three selection output terminals 2a, 2b and 2c, each being associated with a respective channel (in general, about twelve selection output terminals are provided for a practical circuit). A channel selection signal is produced at a selected one of the selection output terminals 2a, 2b and 2c as a function of the selection operation as by operating a corresponding channel selection switch. For example, when the 1-channel is selected, the potential at output terminal 2a corresponds to a binary "0" and the potentials at all of the other terminals 2b and 2c correspond to a binary "1". Thus, when a particular channel is selected, a signal "0" is provided at the output terminal 2a . . . 2c associated with that channel, and a signal "1", is provided at all other terminals. Therefore, the selection output terminal at which the signal "0" appears corresponds to the selected channel.

In tuner 1, 3 denotes a DC voltage supply terminal which is connected through a resistor 4 to a Zener diode 5, which forms a constant voltage circuit, and thence to ground. The ungrounded terminal 5a of the Zener diode 5 is connected to selection output terminals 2a, 2b and 2c of selection circuit 2 via resistors 6a, 6b and 6c, respectively. Each resistor is variable, such as a potentiometer, for presetting the particular channel to which the tuner is tuned if a "0" is provided at the output terminal 2a . . . 2c to which that resistor is coupled. The adjustable elements of variable resistors 6a, 6b and 6c are coupled through reverse-current blocking diodes 9a, 9b and 9c, respectively and a common resistor 7 to terminal 5a. The connection points between common resistor 7 and the respective diodes 9a, 9b and 9c are connected together to the base of a transistor 8 whose emitter is connected to a variable capacitance diode (not shown), serving as a tuning capacitance, to supply the variable capacitance diode with a variable voltage VC. Terminal 5a of Zener diode 5 is coupled to the collector-emitter path of transistor 8, which is connected to ground by a resistor 10. In the FIGURE, 11a, 11b and 11c designate display lamps such as neon lamps, respectively, to indicate which channel has been selected.

Band selection switches 13a, 13b and 13c are provided with movable contacts coupled to selection output terminals 2a, 2b and 2c, respectively, by diodes 14a, 14b and 14c. Each band selection switch, such as 13a, has fixed contacts U, $V_H$, $V_L$ and VTR which are connected to respective inputs of a band selection circuit 15. Band selection circuit 15 is provided with output terminals $V_L$, $V_H$ and U to produce band selection signals designating the band in which tuner 1 operates. When the band selection switch 13a has its movable contact connected to its fixed contact U, and if the selection signal "0" is supplied to switch 13a from selection output terminal 2a, tuner 1 is switched or changed to an operating condition to receive a channel in the UHF band, the particular channel being determined by the voltage preset by variable resistor 6a. When the movable contact of switch 13a is changed to the fixed contact $V_H$ or $V_L$, tuner 1 operates in the high channel range or the low channel range, respectively, of the VHF band. When the movable contact of switch 13a is changed to the fixed contact VTR, tuner 1 is made operable in the low channel range of the VHF band by band selection circuit 15. A video signal reproduced by the VTR then can be displayed if a binary "0" is produced at output terminal 2a and resistor 6a is preset to the predetermined channel. The other band selection switches 13b and 13c are of substantially the same construction as switch 13a. Tuner 1 described above is known in the art, so that the further description thereof will be omitted.

In the FIGURE, 16 designates a synchronizing signal separator circuit which separates a synchronizing signal (for example, the horizontal synchronizing signal) from, for example, a video signal when the video signal is present. 17 designates a detector circuit coupled to separator circuit 16 to detect whether the video signal is present or not. The detector circuit 17 is responsive to a synchronizing signal separated by separator circuit 16 from a video signal to produce an output "1", while when the separator circuit produces no synchronizing signal, the detector produces an output "0".

Signals are supplied to a muting signal generator circuit 18 from detector circuit 17 and from tuner 1. That is, the fixed contacts VTR of all of band selection switches 13a, 13b and 13c in tuner 1 are coupled in common to an inverter 19a of generator circuit 18 to selectively supply a binary "0" thereto. Inverter 19a is coupled to one input of an AND circuit 20. The output from detector circuit 17 is coupled through an inverter 19b to the other input of AND circuit 20. The AND circuit produces an output signal which is supplied from the muting signal generator circuit to the base of a transistor 22 included in a muting circuit 21. The emitter of transistor 22 is grounded and the collector is connected through a capacitor 23 to a transmission path for a low frequency signal. In the FIGURE, 24a designates an input terminal of the transmission path for the low frequency signal, and 24b designates its output terminal, respectively.

Now, the operation of the illustrated circuit will be described. In the following description, it is assumed that the movable contact of band selection switch 13a is connected to its fixed contact U, the movable contact of switch 13c is connected to its fixed contact VTR, and that of the switch 13b is connected to its fixed contact $V_H$, respectively, as shown in the FIGURE. When the output signal at terminal 2a of selection circuit 2 becomes "0" in response to the selection operation for selecting the channel associated with terminal 2a, the output signals at the terminals 2b and 2c become "1", respectively. Since the movable contact of switch 13a, which is connected to terminal 2a, is coupled to its fixed contact U, tuner 1 operates to receive a television broadcast signal in the UHF band at the channel which is previously set by resistor 6a. Therefore, a corresponding television picture is displayed.

Next, if the output signal at terminal 2b of selection circuit 2 becomes "0" to select the channel associated with this terminal, the output signals at terminals 2a and 2c become "1", respectively. Since the movable contact of switch 13b, which is connected to terminal 2b, is coupled to its fixed contact VTR, tuner 1 is conditioned to receive the low channel range of the VHF band and is tuned to the channel previously set by variable resistor 6b, for example, an unused channel (e.g. 2-channel). The "0" output signal at output terminal 2b is inverted by inverter 19a and supplied to one input of AND circuit 20 as a "1". At this time, if the VTR does not reproduce a video signal, or if the reproduced signal from the VTR is not detected by signal detector circuit 17, the output signal from detector 17 is "0". Accordingly, the output signal from inverter 19b is supplied to the other input of AND circuit 20 as a "1". Therefore, the output signal from AND circuit 20 becomes "1" to thereby turn transistor 22 ON. Thus, the low frequency signal transmission path is coupled to ground through capacitor 23 and the collector-emitter path of transistor 22. As a result, no low frequency signal is transmitted, and hence a muting state is presented. That is, until the video signal appears, the sound signal is cut-off. Thereafter, when a video signal is reproduced from the VTR, the output signal from detector circuit 17 becomes "1" and accordingly the output signal from the inverter 19b becomes "0". Thus, the output signal from AND circuit 20 also becomes "0" to thereby turn transistor 22 of muting circuit 21 OFF. As a result, the low frequency signal transmission path is not short-circuited and hence the signal applied to its input terminal 24a is transmitted to output terminal 24b.

If the output signal at terminal 2c becomes "0" to select the associated channel, the fact that the movable contact of band selection switch 13c is connected to its fixed contact $V_H$ makes tuner 1 operative in the high channel range of the VHF band and the television broadcast wave in this high channel range which had been previously set by variable resistor 6c is selected. At this time, the signal supplied to inverter 19a of muting signal generator circuit 18 becomes "1" and accordingly the signal from inverter 19a to AND circuit 20 becomes "0". Therefore, the muting operation of muting circuit 21 is released irrespective of whether a broadcast is received on the selected channel or not.

As described above, according to the present invention, when power is supplied to the VTR, and tuner 1 of the television receiver is set to reproduce the signal from the VTR, the sound signal is cut off until the carrier is generated from the RF converter of the VTR. Therefore, according to the present invention various undesired noises which otherwise would be generated are almost completely removed. Further, according to the present invention, in order to carry out the above muting operation, no special expensive circuitry is required, but only detector circuit 17, muting signal generator circuit 18 and muting circuit 21, as shown in the FIGURE, are sufficient to achieve the above described muting operation.

Further, according to the present invention, upon receiving an ordinary television broadcast wave (at this time, the signal at selection terminal 2a or 2c is "0" in the illustrated example) which is of weak electric field, even if the output from detector circuit 17 becomes "0" (and consequently the output from the inverter 19b becomes "1"), since the signal at one input of AND circuit 20 is still "0", muting of the transmission of the low frequency signal is inhibited.

In the above example of the present invention, channel selection is determined as a function of the voltage derived from the preset variable resistors. In accordance with another embodiment, the channel selection circuit included in the television receiver may be of the synthesizer type in which a so-called PLL (phase locked loop) circuit is used to directly appoint a channel number and hence achieve the channel selection. In this latter embodiment an input channel number may be represented as a digital signal which is logically discriminated to apply a predetermined channel select signal to the muting circuitry.

It will be apparent that many modifications and variations to the present invention may be made by one skilled in the art without departing from the spirit or scope of the novel concepts of the present invention. It is intended that the appended claims be interpreted as including such modifications and variations.

We claim as our invention:

1. Apparatus for muting signals transmitted over a relatively low frequency transmission path in a television receiver of the type having channel selector means for producing a channel select signal to select a corresponding one of a plurality of presettable channels and tuning means responsive to said channel select signal to tune said television receiver to said corresponding channel, said apparatus comprising means for providing a predetermined channel select signal when a predetermined channel is selected; detecting means for producing an output signal when the presence of a video signal at said television receiver is detected irrespective of the particular channel to which said television receiver is tuned; muting signal generating means conditioned when said predetermined channel select signal is provided so as to respond to the absence of said output signal to produce a muting signal; and a muting circuit coupled to said relatively low frequency transmission path and operative in response to said muting signal to attenuate the signals transmitted thereover.

2. The apparatus of claim 1 wherein said muting signal generating means comprises coincidence means having one input supplied with a conditioning signal when said predetermined channel select signal is provided, another input supplied with said output signal, and an output to produce said muting signal when said conditioning signal is supplied to said one input and, coincidentally said output signal is not supplied to said other input.

3. The apparatus of claim 1 wherein said channel selection means includes a plurality of output terminals, each output terminal being associated with a respective channel, a predetermined one of said output terminals being provided with said predetermined channel select signal when the channel associated with said predetermined one output terminal is selected; and wherein said means for providing said predetermined channel select signal comprises switch means coupled to said output terminals and being selectively operative to a condition for supply the predetermined channel select signal from said predetermined one output terminal to said muting signal generating means.

4. The apparatus of claim 3 wherein said switch means comprises a plurality of switches, each switch being coupled to a respective output terminal, and each switch having a plurality of selective conditions, one of said conditions establishing a connection between said respective output terminal and said muting signal generating means to supply said predetermined channel select signal to said muting signal generating means if said switch exhibits said one condition and said predetermined channel select signal is provided at the respective output terminal to which said switch is coupled.

* * * * *